United States Patent
Shih et al.

(10) Patent No.: US 10,084,968 B2
(45) Date of Patent: Sep. 25, 2018

(54) PHOTOGRAPHIC APPARATUS AND EXPOSURE LUMINANCE ADJUSTMENT METHOD

(71) Applicant: VIVOTEK INC., New Taipei (TW)

(72) Inventors: Li-Shan Shih, New Taipei (TW);
Yi-chuan Chen, New Taipei (TW);
Wen-Yuan Li, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/474,115

(22) Filed: Mar. 30, 2017

(65) Prior Publication Data
US 2017/0289422 A1 Oct. 5, 2017

(30) Foreign Application Priority Data
Mar. 31, 2016 (TW) .............................. 105110424 A (51) Int. Cl.
H04N 5/235 (2006.01)
H04N 5/225 (2006.01)
H04N 5/262 (2006.01)

(52) U.S. Cl.
CPC ......... *H04N 5/2354* (2013.01); *H04N 5/2256* (2013.01); *H04N 5/2351* (2013.01); *H04N 5/2621* (2013.01)

(58) Field of Classification Search
CPC .. H04N 5/2354; H04N 5/2256; H04N 5/2351; H04N 5/2621
See application file for complete search history.

(56) References Cited

U.S. PATENT DOCUMENTS

| 7,195,482 B2* | 3/2007 | Scott | A61C 19/004 433/29 |
| 2006/0072843 A1* | 4/2006 | Johnston | G06K 9/20 382/254 |
| 2009/0153797 A1* | 6/2009 | Allon | A61B 3/12 351/206 |
| 2014/0139133 A1* | 5/2014 | Kawasaki | H05B 33/0812 315/291 |
| 2014/0226040 A1* | 8/2014 | Okada | H04N 5/2621 348/239 |

FOREIGN PATENT DOCUMENTS

CN 1477441 2/2004
CN 104104883 10/2014

\* cited by examiner

*Primary Examiner* — Hung Lam
(74) *Attorney, Agent, or Firm* — Andrew M. Calderon; Roberts Mlotkowski Safran Cole & Calderon, P.C.

(57) ABSTRACT

A photographic apparatus includes an image sensor, a processing unit, a light emitting unit, and a control unit. The image sensor is configured to capture a continuous image, and generate an exposure signal according to an exposure sequence corresponding to the continuous image. The processing unit is electrically connected to the image sensor and is configured to calculate an exposure value according to the continuous image. The control unit is electrically connected to the image sensor, the processing unit, and the light emitting unit. According to the exposure value, the control unit may select a continuous mode to drive the light emitting unit to emit light continuously, or a pulse mode to cooperate with the exposure signal to drive the light emitting unit to pulse light, in order to fill light while capturing the continuous image.

19 Claims, 8 Drawing Sheets

PHOTOGRAPHIC APPARATUS AND EXPOSURE LUMINANCE ADJUSTMENT METHOD

CROSS-REFERENCE TO RELATED APPLICATION

This non-provisional application claims priority under 35 U.S.C. § 119(a) to Patent Application No. 105110424 filed in Taiwan, R.O.C. on Mar. 31, 2016, the entire contents of which are hereby incorporated by reference.

BACKGROUND

Technical Field

The present invention relates to a photographic apparatus and an exposure luminance adjustment method, and in particular, to a photographic apparatus that can automatically use different drive modes to drive a light emitting unit of the photographic apparatus to emit light and an exposure luminance adjustment method.

Related Art

It is well known that, because photographic apparatuses can facilitate recording images, the photographic apparatuses are widely used. For example, in a transportation tool, the photographic apparatus may be used as an event data recorder to record vehicle driving states, so that when a traffic accident happens, you can find a record in the photographic apparatus, there by facilitating clarifying traffic accident responsibilities. For another example, in a monitoring system, the photographic apparatus may be used as a monitoring device to record current states of places being monitored in real-time for future investigation, evidence preservation, and the like. Therefore, whether a definition resolution of an image captured by the photographic apparatus is good is very important.

Generally, to enable the photographic apparatus to capture a clear image in any usage environment, the photographic apparatus has a fill-in light structure to fill in light in an environment in which light is insufficient, so as to obtain a clear image. It is well known that the photographic apparatus mostly uses a fixed mode to drive the fill-in light structure to emit a fixed light intensity, but cannot automatically adjust, according to a light change in a usage environment, its drive mode and the light intensity emitted by the fill-in light structure. Therefore, a case in which an image is overexposed or an image is underexposed usually occurs, resulting in worse definition resolution of the image.

SUMMARY

In view of this, the present invention provides a photographic apparatus according to an embodiment. The photographic apparatus includes an image sensor, a processing unit, a light emitting unit, and a control unit. The image sensor is configured to capture a continuous image, and to generate an exposure signal according to an exposure sequence corresponding to the continuous image. The processing unit is electrically connected to the image sensor and is configured to calculate an exposure value according to the continuous image captured by the image sensor. The control unit is electrically connected to the image sensor, the processing unit, and the light emitting unit. According to the exposure value generated by the processing unit, the control unit is configured to select, a continuous mode to drive the light emitting unit to emit light continuously, or a pulse mode to cooperate with the exposure signal to drive the light emitting unit to pulse light, in order to fill light while capturing the continuous image.

The present invention further provides a photographic apparatus according to an embodiment. The photographic apparatus includes an image sensor, a main controller, a light emitting unit, and a control unit. The image sensor is configured to capture a continuous image according to an exposure sequence. The main controller is electrically connected to the image sensor. Moreover, the main controller can be configured to: output the exposure sequence and an exposure signal corresponding to the exposure sequence, and calculate an exposure value according to the continuous image captured by the image sensor. The control unit is electrically connected to the image sensor, the main controller, and the light emitting unit. According to the exposure value generated by the main controller, the control unit can select a continuous mode to drive the light emitting unit to emit light continuously, or a pulse mode to cooperate with the exposure signal output by the main controller to drive the light emitting unit to pulse light, in order to fill light while capturing the continuous image.

In an implementation aspect of the photographic apparatus, the control unit may use a drive current to drive the light emitting unit to emit light, when the control unit selects the continuous mode, the drive current does not exceed a first threshold continuously, and when the control unit selects the pulse mode, a peak of a pulse period of the drive current is not less than a second threshold, where the second threshold is greater than the first threshold.

In an implementation aspect of the photographic apparatus, the control unit further selects a continuous pulse mode to cooperate with the exposure signal in driving the light emitting unit to pulse corresponding light according to the exposure value, where when the control unit selects the continuous pulse mode, the peak of the pulse period of the drive current does not exceed the first threshold.

In an implementation aspect of the photographic apparatus, the control unit may include a control circuit and a drive circuit, where the control circuit may generate a control signal according the exposure value, where the control signal corresponds to the continuous mode or the pulse mode; and the drive circuit may generate the drive current corresponding to the continuous mode or the pulse mode, according to the control signal.

In an implementation aspect of the photographic apparatus, when a level of the control signal is greater than a first potential, the drive current has a maximum current value.

In an implementation aspect of the photographic apparatus, when the level of the control signal is less than a second potential, the drive circuit generates the drive current according to the level of the control signal and the maximum current value, where the second potential is less than the first potential.

In an implementation aspect of the photographic apparatus, each period of the exposure sequence includes an exposure time and a wait time, each period of the exposure signal includes a conduction time and a cut-off time, where each conduction time is greater than each exposure time.

The present invention still further provides a photographic apparatus according to an embodiment. The photographic apparatus includes an image sensor, a light emitting unit, and a control unit. The image sensor is configured to capture a continuous image, and to generate an exposure signal according to an exposure sequence corresponding to the continuous image. The control unit is electrically connected to the image sensor and the light emitting unit.

According to a frequency of the exposure sequence, the control unit may select a continuous mode to drive the light emitting unit to emit light continuously, or a pulse mode to cooperate with the exposure signal to drive the light emitting unit to pulse light, in order to fill light while capturing the continuous image.

In an implementation aspect of the photographic apparatus, when the frequency of the exposure sequence is less than a first frequency, the control unit selects the continuous mode to drive the light emitting unit to emit light continuously; or when the frequency of the exposure sequence is greater than a second frequency, the control unit selects the pulse mode to cooperate the exposure signal to drive the light emitting unit to pulse light, where the second frequency is greater than the first frequency.

The present invention yet further provides an exposure luminance adjustment method applied to a photography apparatus having a light emitting unit. The method includes following steps: (a) calculating an exposure value according to a continuous image; (b) generating an exposure signal according to an exposure sequence corresponding to the continuous image; and (c) selecting a continuous mode to drive the light emitting unit to emit light continuously, or a pulse mode to cooperate with the exposure signal to drive the light emitting unit to pulse light, according to the exposure value.

In an implementation aspect of the exposure luminance adjustment method, the step (c) includes: generating a drive current corresponding to the selection of the continuous mode or the pulse mode, according to the exposure value; and driving the light emitting unit to emit light continuously or to pulse light, according to the drive current.

In an implementation aspect of the exposure luminance adjustment method, when the continuous mode is selected, the corresponding drive current does not exceed a first threshold; or when the pulse mode is selected, the corresponding drive current is not less than a second threshold, where the second threshold is greater than the first threshold.

In an implementation aspect of the exposure luminance adjustment method, wherein the step (c) further includes a continuous pulse mode to be selected to cooperate with the exposure signal to driving the light emitting unit to pulse light according to the exposure value, where luminance of the light emitted by the light emitting unit in the continuous pulse mode is less than luminance of the light emitted by the light emitting unit in the pulse mode.

To sum up, in the photographic apparatus and the exposure luminance adjustment method according to the embodiments of the present invention, by means of an exposure value of a captured continuous image, different modes are automatically selected to drive a light emitting unit to emit corresponding light, in order to fill light while capturing the continuous image, thereby obtaining a clear continuous image having a proper exposure value. In addition, in the photographic apparatus and the exposure luminance adjustment method according to the embodiments of the present invention, further, an exposure signal corresponding to an exposure sequence may be used to synchronize actuations of the light emitting unit and an image sensor, and other complex phase detection circuits are not required.

The following describes detailed features and advantages of the present invention in implementation manners, which can enable any person skilled in the art to know technical content of the present invention and perform implementation accordingly. Moreover, according to content disclosed in the specification, the application patent scope, and accompanying drawings, any person skilled in the art may easily understand the objectives and advantages related to the present invention.

DETAILED DESCRIPTION

Figure 1:
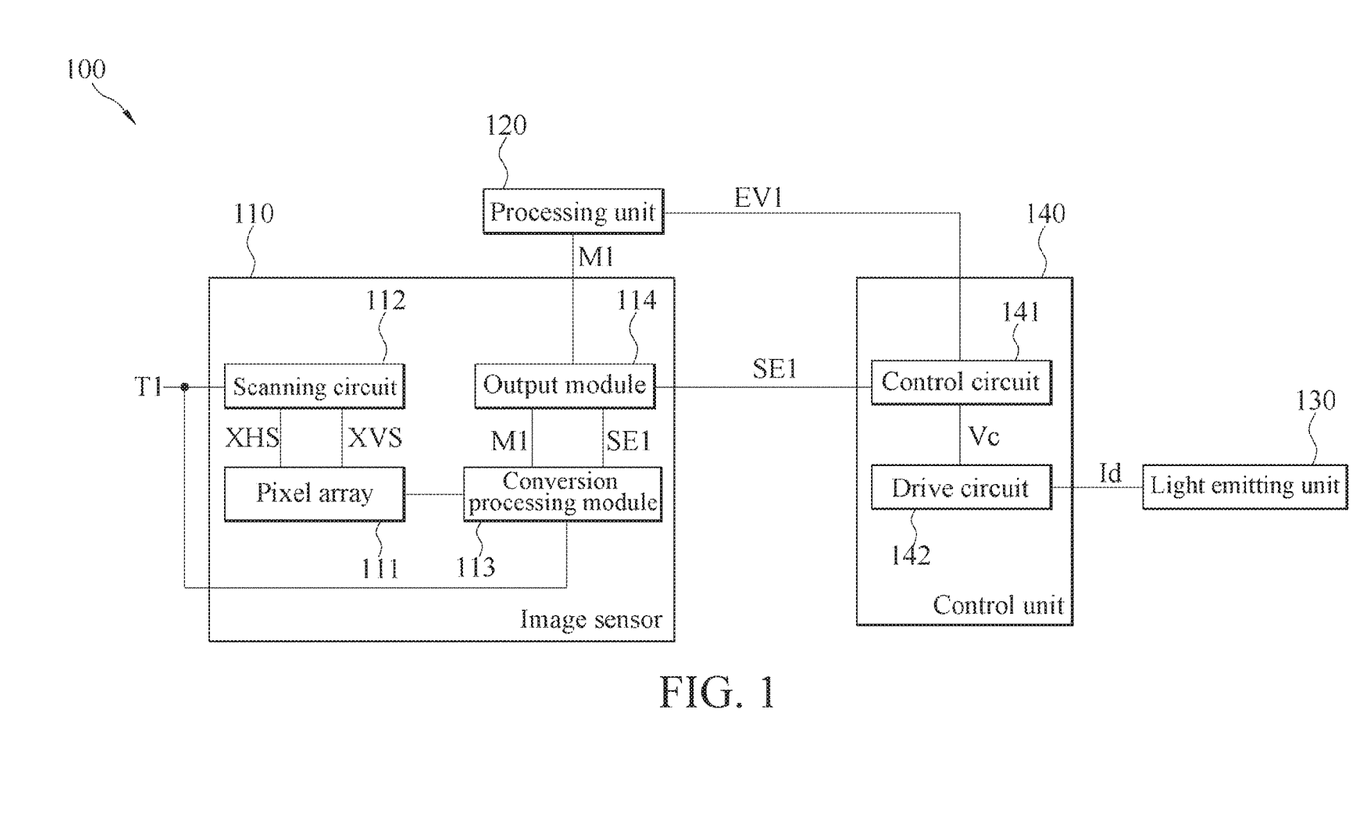
FIG. 1 is a schematic block diagram of a photographic apparatus of a first embodiment of the present invention.
Figure 2:
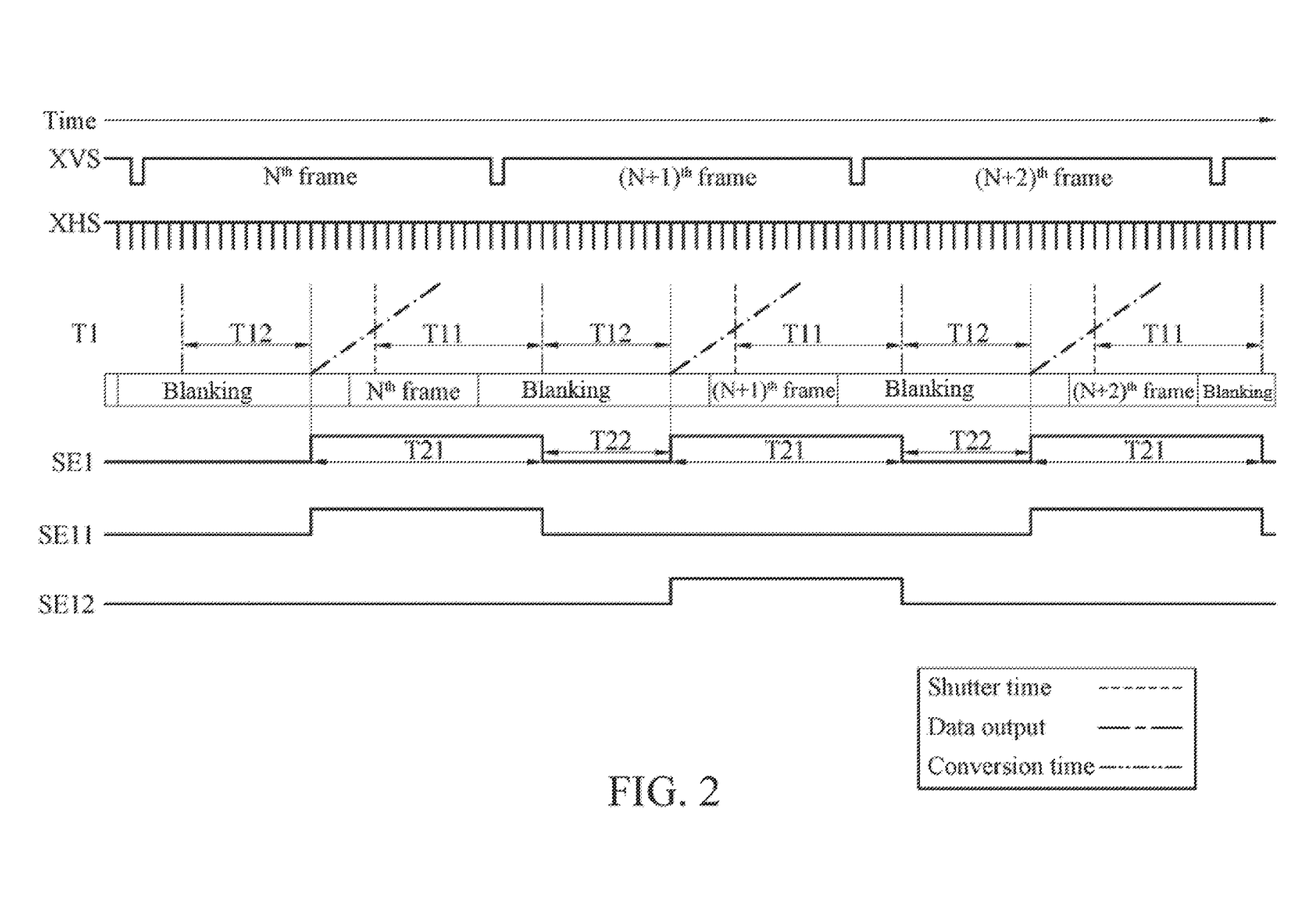
FIG. 2 is a schematic time sequence diagram of a photographic apparatus according to an embodiment of the present invention.

FIG. 1 is a schematic block diagram of a photographic apparatus of a first embodiment of the present invention, and FIG. 2 is a schematic time sequence diagram of a photographic apparatus according to an embodiment of the present invention. Referring to FIG. 1 and FIG. 2, the photographic apparatus 100 includes an image sensor 110, a processing unit 120, a light emitting unit 130, and a control unit 140. The processing unit 120 is coupled to the image sensor 110. The control unit 140 is coupled to the image sensor 110, the processing unit 120, and the light emitting unit 130.

In this embodiment, the image sensor 110, the processing unit 120, and the control unit 140 are disposed in a housing of the photographic apparatus 100, while the light emitting unit 130 is disposed outside of the housing of the photographic apparatus 100. In this case, the light emitting unit 130 may be implemented by using a light emitting diode (LED), and there may be more than one light emitting diode.

The image sensor 110 may be configured to capture a continuous image M1. The continuous image M1 refers to multiple frames captured by the image sensor 110 on a continuous time. Herein, the image sensor 110 may control an exposure time of each frame in the continuous image M1 according to a preset exposure sequence T1.

In an implementation aspect, the image sensor 110 may be a complementary metal-oxide-semiconductor (CMOS) sensor, a charge coupled device (CCD) sensor, and the like.

In this embodiment, the image sensor 110 may include a pixel array 111, a scanning circuit 112, a conversion processing module 113, and an output module 114.

The pixel array 111 includes multiple pixel units arranged two-dimensionally. The scanning circuit 112 includes multiple horizontal signal lines and vertical signal lines. Each pixel unit in the pixel array 111 is coupled to a corresponding horizontal signal line and a corresponding vertical signal line in the scanning unit 112, so as to perform corresponding actuations according to a horizontal scanning signal XHS of the horizontal signal line and a vertical scanning signal XVS of the vertical signal line.

The scanning circuit 112 may output a corresponding horizontal scanning signal XHS by using a horizontal signal line of the scanning unit 112, and output a corresponding vertical scanning signal XVS by using a vertical signal line, according to the preset exposure sequence T1. Herein, the exposure sequence T1 may be a periodic time sequence, and each period includes an exposure time T11 and a wait time T12. Therefore, in the exposure time T11 of the exposure sequence T1, the scanning unit 112 may actuate a corresponding pixel unit to convert an incident light entering through a camera group (not shown in the figure) of the photographic apparatus 100 into accumulated electric charge, by using its horizontal signal line and vertical signal line, and in the wait time T12 of the exposure sequence T1, each pixel unit outputs its accumulated electric charge as a pixel signal to the conversion processing module 113 to perform corresponding signal processing.

In this embodiment, the image sensor 110 may perform a global shutter operation, and the scanning circuit 112 controls all pixel units in the pixel array 111 to perform exposure at the same time. However, the present invention is not limited thereto. The image sensor 110 may also perform a rolling shutter operation, and the scanning circuit 112 controls pixel units of each row in the pixel array 111 to perform exposure in sequence.

The conversion processing module 113 is coupled to the pixel array 111, so that after the corresponding continuous image M1 is converted according to a pixel signal output by each pixel unit in the pixel array 111, the continuous image M1 is output by the output module 114. Herein, the output module 114 may directly output the continuous image M1 in an original data format, or convert the continuous image M1 into another data format and then output. In an implementation aspect, the conversion processing module 113 may be an analog-to-digital converter (ADC).

In addition, in this embodiment, the conversion processing module 113 of the image sensor 110 may generate an exposure signal SE1 according to the exposure sequence of the continuous image M1, so that the control unit 140 may use the exposure signal SE1 to synchronize actuations of the light emitting unit 130 and the image sensor 110. Herein, the exposure signal SE1 is a periodic signal, and each period includes a conduction time T21 and a cut-off time T22.

In an implementation aspect, a length of each conduction time T21 of the exposure signal SE1 may be greater than a length of each exposure time T11 of the exposure sequence T1, so as to ensure that the light emitting unit 130 may fill in light when the image sensor 110 captures the continuous image M1.

Figure 3:
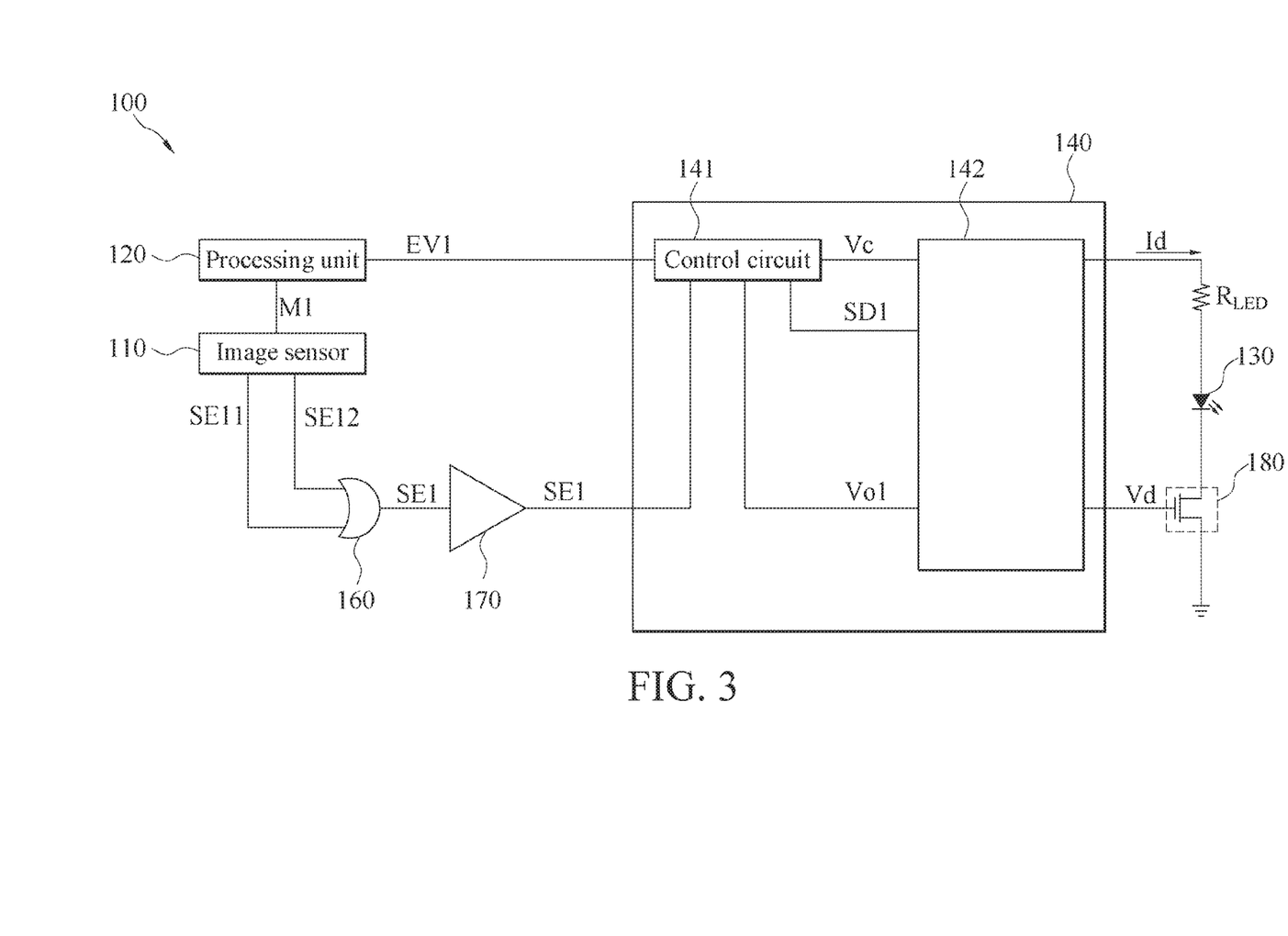
FIG. 3 is a schematic block diagram of an implementation aspect of FIG. 1.

FIG. 3 is a schematic block diagram of an implementation aspect of FIG. 1. Referring to FIG. 2 and FIG. 3, in an implementation aspect, the exposure signal SE1 may be obtained by using at least two clock signals (hereinafter referred to as a first clock signal SE11 and a second clock signal SE12) through a logical operation unit 160. For example, the exposure signal SE1 may be obtained after OR gate stacking performed on the first clock signal SE11 and the second clock signal SE12. Herein, a phase of the first clock signal SE11 and a phase of the second clock signal SE12 may not be overlapped. However, the present invention is not limited thereto. In addition, before the exposure signal SE1 is transmitted to the control unit 140, the exposure signal SE1 may further be converted to a required level by using a voltage level conversion circuit 170 and then transmitted to the control unit 140.

The processing unit 120 may calculate a corresponding exposure value EV1 according to the continuous image M1 captured by the image sensor 110. In this case, the processing unit 120 may generate a corresponding histogram according to the continuous image M1, and then generate the corresponding exposure value EV1, after calculating an average luminance value of the continuous image M1 according to the histogram. However, the present invention is not limited thereto.

In an implementation aspect, the processing unit 120 may be implemented by using a System-On-a-Chip (SoC), a central processing unit (CPU), a microprocessor, an application-specific integrated circuit (ASIC), or the like.

The control unit 140 may determine to use which drive mode to drive the light emitting unit 130, according to a value of the exposure value EV1 generated by the processing unit 120, and generate a drive signal Vd corresponding to the drive mode to the light emitting unit 130, so that the light emitting unit 130 may perform a corresponding actuation on the drive signal Vd. In this case, the drive mode may include a continuous mode and a pulse mode.

In this embodiment, the photographic apparatus 100 may further include a switch module 180, coupled between the control unit 140 and the light emitting unit 130. In this case, the switch module 180 may conduct the light emitting unit 130 according to a level change of the drive signal Vd. In an implementation aspect, the light emitting unit 130 may be a light emitting diode (LED), and the switch module 180 may be implemented by using an N-channel metal oxide semiconductor (NMOS). A drain electrode of the NMOS is coupled to a negative end of the light emitting diode, and a source electrode the NMOS is coupled to a ground potential. However, the present invention is not limited thereto.

When the control unit 140 selects the continuous mode to drive the light emitting unit 130, the drive signal Vd generated by the control unit 140 may be a constant voltage signal with a fixed level, so as to persist conducting the light emitting unit 130 and enable the light emitting unit 130 to emit light continuously. However, when the control unit 140 selects the pulse mode to drive the light emitting unit 130, the drive signal Vd generated by the control unit 140 may be a pulse signal, so that the light emitting unit 130 is conducted in a discontinuous manner, and the light emitting unit 130 is enabled to pulse (discontinuously emit) light.

Herein, in the pulse mode, a period change of the drive signal Vd is roughly the same as a period change of the exposure signal SE1. Therefore, in the pulse mode, the control unit 140 actually cooperates with the period change of the exposure signal SE1 to drive the light emitting unit 130 to pulse light. In other words, the light emitting unit 130 may emit light within a conduction time T21 of each period of the exposure signal SE1, and stop emitting light at a cut-off time T22 of each period of the exposure signal SE1, so as to pulse light. In addition, because the exposure signal SE1 corresponds to the exposure sequence T1 of the continuous image M1, the control unit 140 may use the exposure signal SE1 to ensure that the light pulsed by the light emitting unit 130 may actually fill light while the image sensor 110 capturing the continuous image M1.

Figure 4:
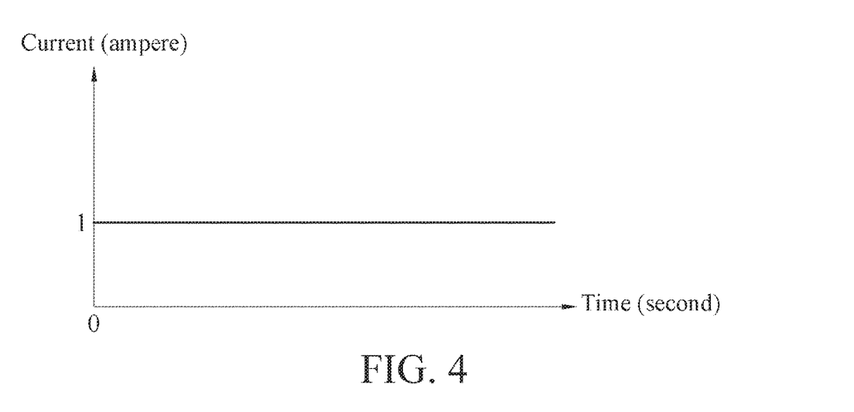
FIG. 4 is a schematic diagram of a drive current in a continuous mode.
Figure 5:
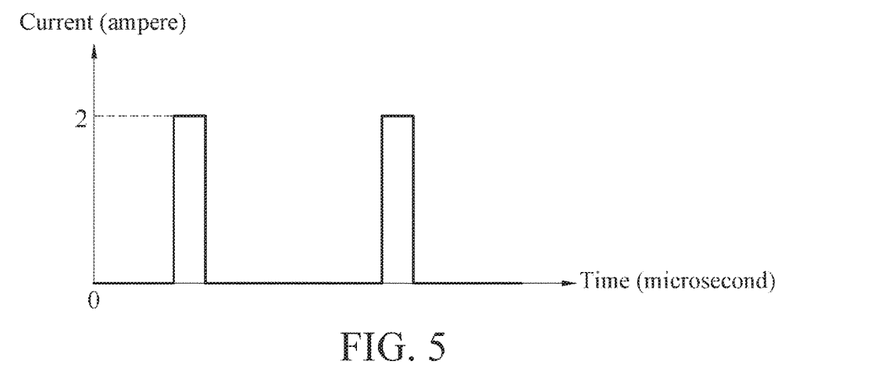
FIG. 5 is a schematic diagram of a drive current in a pulse mode.

Further, the control unit 140 may generate a drive current Id to the light emitting unit 130 according to the drive mode selected by the control unit 140, in order to drive the light emitting unit 130 to emit corresponding light. When the control unit 140 selects the continuous mode to drive the light emitting unit 130, the drive current Id generated by the control unit 140 may be a constant current, and a value of the constant current does not exceed a first threshold, as shown in FIG. 4; however, when the control unit 140 selects the pulse mode to drive the light emitting unit 130, the drive current Id generated by the control unit 140 is a pulse wave current and a peak of a pulse period of the pulse wave current is not less than a second threshold, as shown in FIG. 5, wherein the second threshold is greater than the first threshold. In an implementation aspect, a frequency of the drive current Id when the control unit 140 selects the pulse mode may be within a range from 0.5 kilohertz (kHz) to 16 kilohertz (kHz), and a pulse width of the drive current Id may be within a range from 0.6 microseconds (μs) to 20 microseconds (μs).

Because the drive current Id in the pulse mode is roughly greater than the drive current Id in the continuous mode, luminance emitted by the light emitting unit 130 in the continuous mode is less than luminance emitted by the light emitting unit 130 in the pulse mode.

Therefore, when the control unit 140 determining that the continuous image M1 is overexposed according to the exposure value EV1 generated by the processing unit 120, the control unit 140 may select the continuous mode to drive the light emitting unit 130 to emit light continuously, so as to decrease the exposure value EV1 of the continuous image M1. However, when the control unit 140 determining that the continuous image M1 is underexposed according to the exposure value EV1 generated by the processing unit 120, the control unit 140 may select the pulse mode to drive the light emitting unit 130 to pulse light, so as to increase the exposure value EV1 of the continuous image M1.

In an implementation aspect, the first threshold may be 1 ampere (A), and the second threshold may be 2 amperes (A).

In addition, besides the continuous mode and the pulse mode, the drive mode may further include a continuous pulse mode. When the control unit 140 selects the continuous pulse mode to drive the light emitting unit 130, the drive signal Vd generated by the control unit 140 may be a pulse signal, so that the light emitting unit 130 is conducted in a discontinuous manner, and the light emitting unit 130 is enabled to pulse (discontinuously emit) light. Herein, the period change of the drive signal Vd is roughly the same as the period change of the exposure signal SE1. Therefore, in the continuous pulse mode, the control unit 140 also cooperates with the period change of the exposure signal SE1 in driving the light emitting unit 130 to pulse light.

Figure 6:
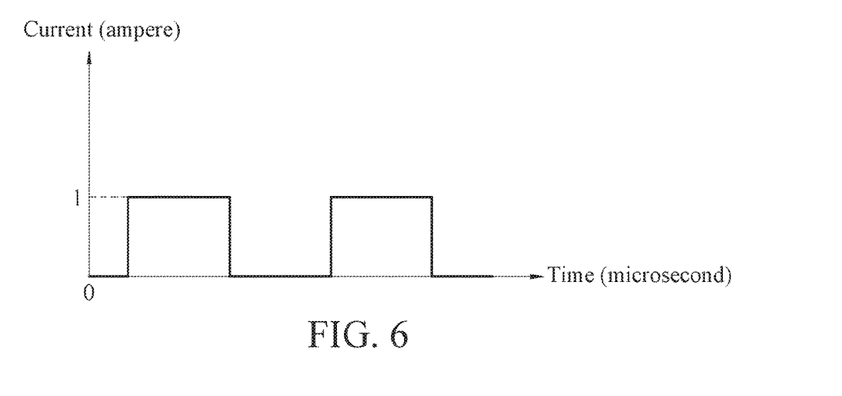
FIG. 6 is a schematic diagram of a drive current in a continuous pulse mode.

In addition, the drive current Id generated by the control unit 140 in the continuous pulse mode is also a pulse wave current, but a peak of a pulse period of the pulse wave current does not exceed the first threshold, as shown in FIG. 6. Therefore, luminance emitted by the light emitting unit 130 in the continuous pulse mode is less than the luminance emitted by the light emitting unit 130 in the pulse mode. In other words, when the control unit 140 determines that the continuous image M1 is overexposed according to the exposure value EV1, besides selecting the continuous mode to drive the light emitting unit 130 to emit light continuously, the control unit 140 may also select the continuous pulse mode to cooperate with the exposure signal SE1 in driving the light emitting unit 130 to pulse light.

In this embodiment, the control unit 140 may include a control circuit 141 and a drive circuit 142. The control circuit 141 is coupled to the processing unit 120, the image sensor 110, and the drive circuit 142.

After determining to use the continuous mode or the pulse mode to drive the light emitting unit 130 according to the value of the exposure value EV1, the control circuit 141 generates a corresponding control signal Vc to the drive circuit 142, so that the drive circuit 142 may generate a corresponding drive current Id according to a level of the control signal Vc, and the control circuit 141 generates an output signal Vo1 corresponding to the continuous mode or the pulse mode to the drive circuit 142, so that the drive circuit 142 may generate a corresponding drive signal Vd to the light emitting unit 130 according to the output signal Vo1. Therefore, the light emitting unit 130 may actuate according to the drive signal Vd and emit light of a corresponding luminance according to a value of the drive current Id, so as to fill light while the image sensor 110 capturing the continuous image M1.

When the control circuit 141 selects the continuous mode, the generated output signal Vo1 may be a constant voltage signal, and the drive signal Vd generated by the drive circuit 142 is also a constant voltage signal, so that the switch module 180 is conducted continuously and the light emitting unit 130 is enabled to emit corresponding light luminance according to the drive current Id. However, when the control circuit 141 selects the pulse mode, the generated output signal Vo1 may be a pulse wave signal, and the drive signal Vd generated by the drive circuit 142 is also a pulse wave signal, so that the switch module 180 is conducted discontinuously and the light emitting unit 130 is enabled to pulse corresponding light luminance according to the drive current Id. Herein, the drive signal Vd is roughly the same as the output signal Vo1.

Figure 7:
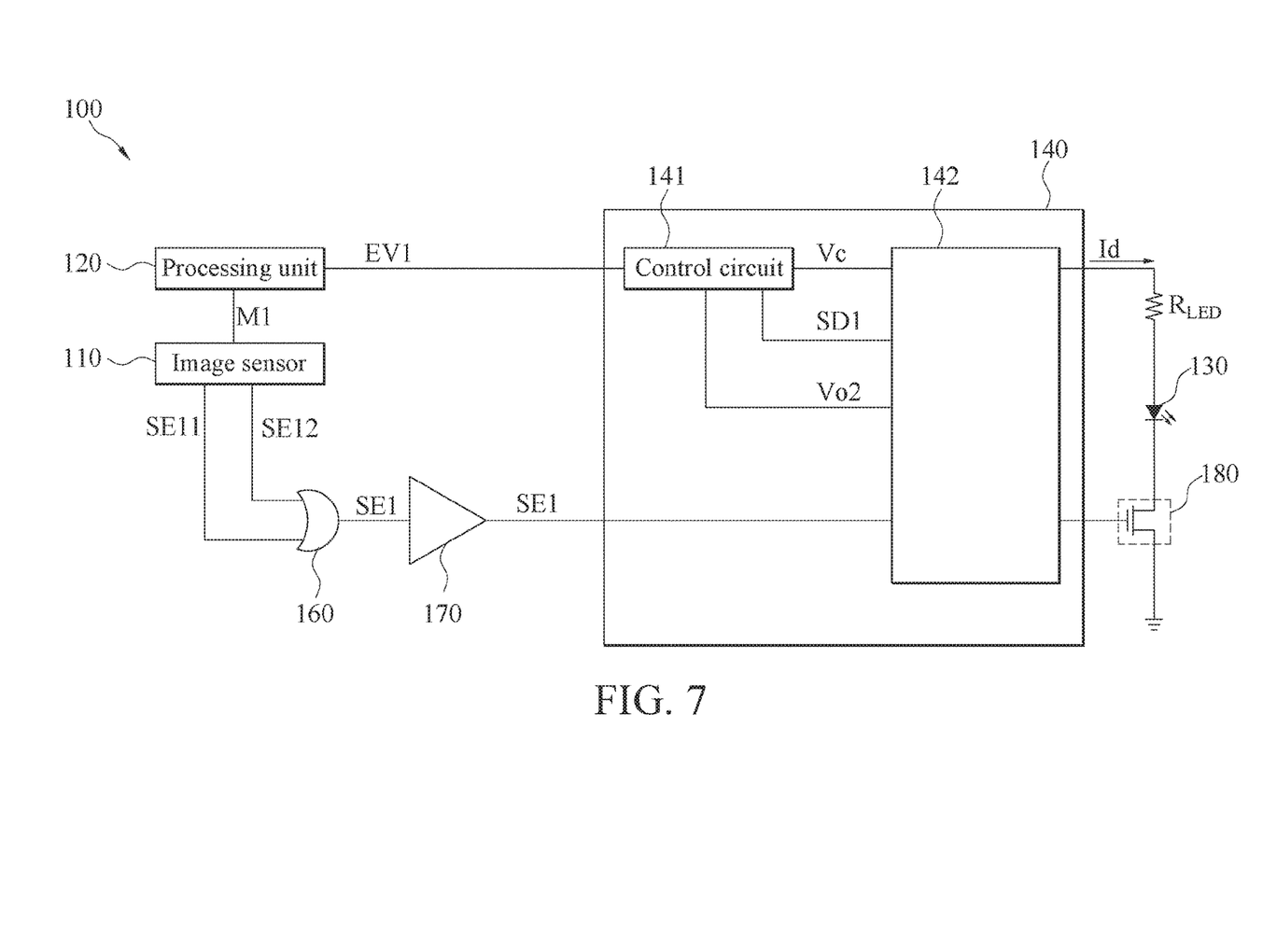
FIG. 7 is a schematic block diagram of another implementation aspect of FIG. 1.

FIG. 7 is a schematic block diagram of another implementation aspect of FIG. 1. Referring to FIG. 7, in this implementation aspect, the control unit 140 may include a control circuit 141 and a drive circuit 142. The control circuit 141 is coupled to the processing unit 120, and the drive circuit 142 is coupled to the image sensor 110 and the processing unit 120.

The control circuit 141 may determine to use the continuous mode or the pulse mode to drive the light emitting unit 130 according to the value of the exposure value EV1, and generate an output signal Vo2 to the drive circuit 142, so that the drive circuit 142 may perform a corresponding actuation according to the output signal Vo2.

Herein, when the control circuit 141 selects the continuous mode, the generated output signal Vo2 may be logic "1", so that the drive circuit 142 generates a drive signal Vd having a constant potential to the switch module 180, so that the light emitting unit 130 may continuously emit corresponding light luminance according to the drive current Id. However, when the control circuit 141 selects the pulse mode, the generated output signal Vo2 may be logic "0", so that the drive circuit 142 may generate a corresponding drive signal Vd to the switch module 180 according to the exposure signal SE1. Herein, the drive signal Vd generated according to the exposure signal SE1 is a pulse wave signal, so that the light emitting unit 130 may pulse corresponding light luminance according to the drive current Id.

In this embodiment, the photographic apparatus 100 further includes a current-limiting resistor $R_{LED}$. The current-limiting resistor $R_{LED}$ is coupled between the drive circuit 142 and the light emitting unit 130. Herein, the current-limiting resistor $R_{LED}$ is configured to limit a maximum current value of the drive current Id, and one end of the current-limiting resistor $R_{LED}$ is coupled to a positive end of the light emitting unit 130.

When a level of the control signal Vc is greater than a first potential, the drive current Id generated by the drive circuit 142 may have a maximum current value. When the level of the control signal Vc is less than a second potential, the value of the drive current Id generated by the drive circuit 142 may be obtained according to the level of the control signal Vc and a maximum current value, and by using an expression (e.g., expression 2 described below), wherein the second potential is greater than the first potential.

In an implementation aspect, when the level of the control signal Vc is greater than the first potential, the drive current Id may be expressed by using the following expression 1: Id=100 mV/$R_{LED}$. When the level of the control signal Vc is less than the second potential, the drive current Id may be expressed by using the following expression 2: Id=(Vc−100 mV)/(10*$R_{LED}$), where Id is a value of the drive current, $R_{LED}$ is a value of the current-limiting resistor, and Vc is a level of the control signal. Herein, the first potential may be 1.2 volts (V), and the second potential may be 1 volt (V).

For example, it is assumed that a value of the current-limiting resistor is 0.04 ohm (a), when the level of the control signal Vc is greater than 1.2 volts (V), the drive circuit 142 may calculate and generate, according to the expression 1, a drive current Id whose value is 2.5 amperes (A). When the level of the control signal Vc is less than 1 volt, for example, when the level of the control signal Vc is 0.5 volt (V), the drive circuit 142 may calculate and generate, according to the formula 2, a drive current Id whose value is 1 ampere (A).

In this embodiment, the control circuit 141 may further determine whether to disable the actuation of the drive circuit 142 according to the exposure value EV1 of the continuous image M1, so that the light emitting unit 130 stops emitting light. Therefore, when the control circuit 141 determines that the image sensor 110 does not require light filling-in according to the exposure value EV1, a disabling signal SD1 is generated to the drive circuit 142, so as to stop actuating of the drive circuit 142.

In an implementation aspect, the control unit 140 may be implemented by using a micro control unit (MCU), a central processing unit (CPU), an application-specific integrated circuit, and the like. In addition, the control unit 140 and the processing unit 120 may be implemented in different aspects, or may be integrated in a single implementation aspect.

Figure 8:
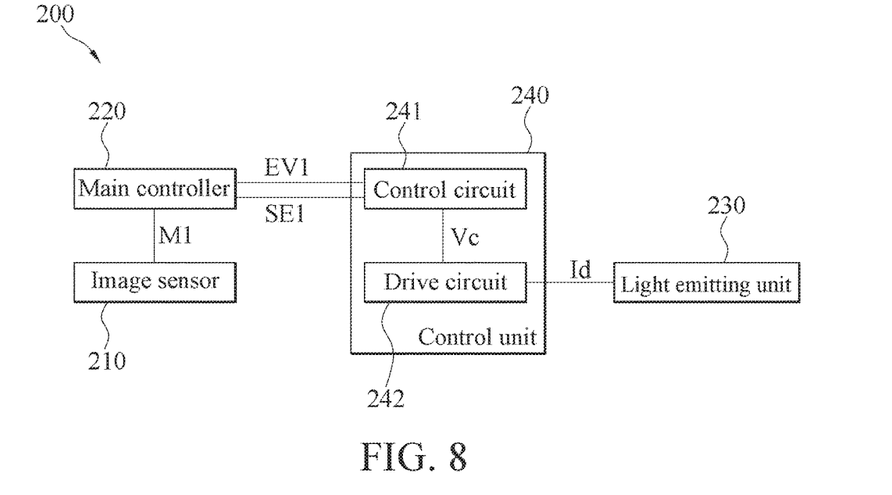
FIG. 8 is a schematic block diagram of a photographic apparatus of a second embodiment of the present invention.

FIG. 8 is a schematic block diagram of a photographic apparatus of a second embodiment of the present invention. Referring to FIG. 2, the photographic apparatus 200 includes an image sensor 210, a main controller 220, a light emitting unit 230, and a control unit 240. In addition, the control unit 240 includes a control circuit 241 and a drive circuit 242. The main controller 220 is coupled to the image sensor 210, the control circuit 241 is coupled to the main controller 220, and the drive circuit 242 is coupled to the control circuit 241 and the light emitting unit 230.

Herein, the image sensor 210 is roughly the same of the image sensor 110 in the first embodiment, but in this embodiment, the image sensor 210 is only configured to capture a corresponding continuous image M1 according to a preset exposure sequence T1, but does not generate an exposure signal SE1.

In addition, the main controller 220 may be configured to calculate the corresponding exposure value EV1 according to the continuous image M1 captured by the image sensor 210 as the processing unit 120 in the first embodiment, and the main controller 220 may further be configured to generate a corresponding exposure signal SE1 according to the preset exposure sequence. In an implementation aspect, the main controller 220 may be implemented by using a SoC, a central processing unit, a microprocessor, an application-specific integrated circuit, or the like.

Because in this embodiment, a detailed structure of the image sensor 210 is roughly the same as a detailed structure of the image sensor 110 in the first embodiment, an overall structure of the light emitting unit 230 is roughly the same as an overall structure of the light emitting unit 130 in the first embodiment, and a detailed structure, operations, and drive modes of the control unit 240 is roughly the same as those of the control unit 140 in the first embodiment, and details are not described herein again.

Figure 9:
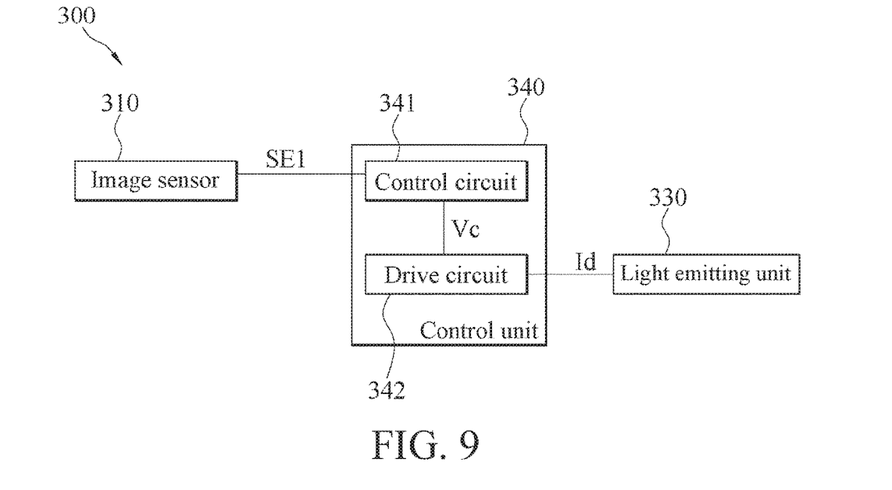
FIG. 9 is a schematic block diagram of a photographic apparatus of a third embodiment of the present invention.

FIG. 9 is a schematic block diagram of a photographic apparatus of a third embodiment of the present invention. Referring to FIG. 9, the photographic apparatus 300 includes an image sensor 310, a light emitting unit 330, and a control unit 340. The control unit 340 is coupled to the image sensor 310 and the light emitting unit 330.

The image sensor 310 may be configured to capture a continuous image M1, and the image sensor 310 may be further configured to generate an exposure signal SE1 according to an exposure sequence T1 corresponding to the continuous image M1. Herein, because overall structures, operations, and the like of the image sensor 310 and the light emitting unit 330 are roughly the same as overall structures, operations, and the like of the image sensor 110 and the light emitting unit 130 in the first embodiment, details are not described again.

Compared with the first embodiment and the second embodiment, the control unit 340 in this embodiment selects a continuous mode to drive the light emitting unit 330 to emit light continuously, or a pulse mode to cooperate with the exposure signal SE1 in driving the light emitting unit 330 to pulse light, according to a frequency of the exposure sequence T1, so as to fill light when the image sensor 310 captures the continuous image M1.

In addition, the control unit 340 may generate a corresponding drive current Id1 to the light emitting unit 330 according to the drive mode selected by the control unit 340, to drive the light emitting unit 330 to emit corresponding light. When the control unit 340 selects the continuous mode to drive the light emitting unit 330, the drive current Id1 generated by the control unit 340 may be a constant current, and a value of the constant current does not exceed a first threshold; however, when the control unit 340 selects the pulse mode to drive the light emitting unit 330, the drive current Id1 generated by the control unit 340 is a pulse wave current, and a peak value of a pulse period of the pulse wave current is not less than a second threshold, where the second threshold is greater than the first threshold.

In an implementation aspect, the first threshold may be 1 ampere (A), and the second threshold may be 2 amperes (A). Therefore, luminance emitted by the light emitting unit 330 in the continuous mode is less than luminance emitted by the light emitting unit 330 in the pulse mode.

Therefore, when the frequency of the exposure sequence T1 is less than a first frequency, for example, 100 hertz (Hz), in this case, because a speed at which the image sensor 310 captures the continuous image M1 is relatively slow, the light emitting unit 330 may fill in too much light, so that the control unit 340 may select the continuous mode to drive the light emitting unit 330 to emit light continuously. However, when the frequency of the exposure sequence is greater than a second frequency, for example, 1000 hertz (Hz), in this case, because the speed at which the image sensor 310 captures the continuous image M1 is relatively fast, the light emitting unit 330 may fill in insufficient light, so that the control unit 340 may select the pulse mode to drive the light emitting unit 330 to pulse light.

In this embodiment, it should be noted that the present invention does not limit the control unit 340 to determine the drive mode of the light emitting unit 330 only according to the frequency of the exposure sequence T1. In an implementation aspect, the control unit 340 may also determine the drive mode of the light emitting unit 330 according to the frequency of the exposure sequence T1 and in combination with the exposure value EV1 of the continuous image M1.

Figure 10:
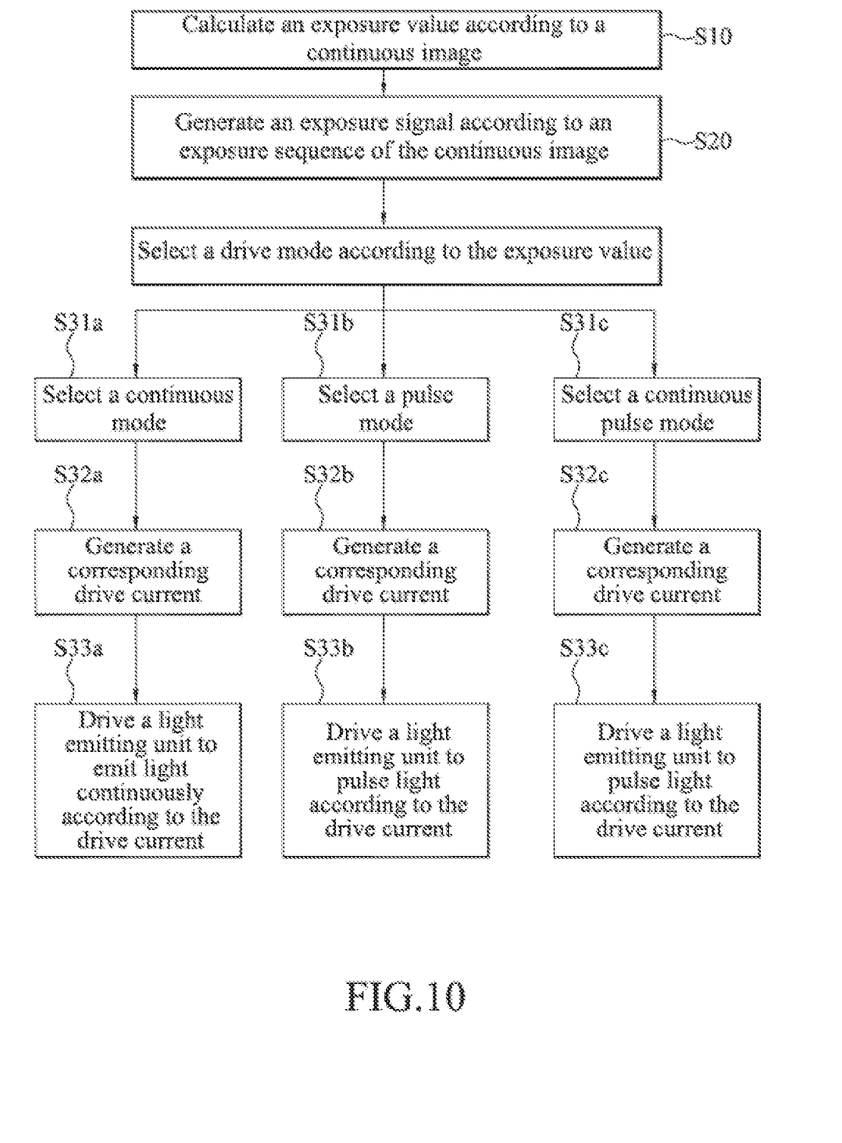
FIG. 10 is a schematic flowchart of an exposure luminance adjustment method according to an embodiment of the present invention.

FIG. 10 is a schematic flowchart of an exposure luminance adjustment method according to an embodiment of the present invention. Referring to FIG. 1 and FIG. 10, in the exposure luminance adjustment method applied to a photographic apparatus having a light emitting unit according to an embodiment of the present invention, the photographic apparatus 100 may calculate an exposure value EV1 of a continuous image M1 by using the processing unit 120, according to the continuous image M1 captured by the image sensor 110 (step S10), and generate an exposure signal SE1, by using the image sensor 110, according to an exposure sequence T1 of the continuous image M1 (step S20). Herein, the order of step S10 may be exchanged with that of step S20. However, the present invention is not limited thereto, and step S10 and step S20 may be performed at the same time.

After the processing unit 120 calculates the exposure value EV1 of the continuous image M1, the control unit 140 of the photographic apparatus 100 may select a drive mode of the light emitting unit 130 according to the exposure value EV1. Herein, the drive mode may include a continuous mode, a pulse mode, and a continuous pulse mode.

When the control unit 140 selects the continuous mode according to the exposure value EV1 (step S31a), the control unit 140 may generate a corresponding drive current Id (step S32a), and drive the light emitting unit 130 to emit light continuously according to the drive current Id (step S33a). In the continuous mode, the drive current Id does not exceed a first threshold.

When the control unit 140 selects the pulse mode according to the exposure value EV1 (step S31b), the control unit 140 may generate a corresponding drive current Id (step S32b), and drive the light emitting unit 130 to pulse light according to the drive current Id (step S33b). In the pulse mode, a peak value of a pulse period of the drive current Id is not less than a second threshold.

When the control unit 140 selects the continuous pulse mode according to the exposure value EV1 (step S31c), the control unit 140 may generate a corresponding drive current Id (step S32c), and drive the light emitting unit 130 to pulse light according to the drive current Id (step S33c). In the continuous pulse mode, the peak value of the pulse period of the drive current Id does not exceed the first threshold.

To sum up, according to the photographic apparatus and the exposure luminance adjustment method in the embodiments of the present invention, by using an exposure value of a captured continuous image, different modes are automatically selected to drive a light emitting unit to emit corresponding light, in order to fill light while capturing the continuous image, thereby obtaining a clear continuous image having a proper exposure value. In addition, in the photographic apparatus and the exposure luminance adjustment method according to the embodiments of the present invention, further, an exposure signal corresponding to an exposure sequence is used to synchronize actuations of the light emitting unit and an image sensor, and other complex phase detection circuits are not required.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A photographic apparatus, comprising:
   an image sensor configured to capture a continuous image and to generate an exposure signal according to an exposure sequence corresponding to the continuous image;
   a processing unit electrically connected to the image sensor and configured to calculate an exposure value according to the continuous image;
   a light emitting unit; and
   a control unit electrically connected to the image sensor, the processing unit and the light emitting unit, and according to the exposure value, the control unit configured to select a continuous mode to drive the light emitting unit to emit light continuously, or a pulse mode to cooperate with the exposure signal to drive the light emitting unit to pulse light, in order to fill light while capturing the continuous image.

2. The photographic apparatus according to claim 1, wherein the control unit uses a drive current to drive the light emitting unit to emit light, when the control unit selects the continuous mode, the drive current does not exceed a first threshold continuously, and when the control unit selects the pulse mode, a peak of a pulse period of the drive current is not less than a second threshold, wherein the second threshold is greater than the first threshold.

3. The photographic apparatus according to claim 2, wherein the control unit further selects a continuous pulse mode to cooperate with the exposure signal in driving the light emitting unit to pulse corresponding light according to the exposure value, wherein when the control unit selects the continuous pulse mode, the peak of the pulse period of the drive current does not exceed the first threshold.

4. The photographic apparatus according to claim 1, wherein each period of the exposure sequence comprises an exposure time and a wait time, each period of the exposure signal comprises a conduction time and a cut-off time, wherein each conduction time is greater than each exposure time.

5. The photographic apparatus according to claim 2, wherein the control unit comprises:
   a control circuit configured to generate a control signal according the exposure value, wherein the control signal corresponds to the continuous mode or the pulse mode; and
   a drive circuit configured to generate the drive current corresponding to the continuous mode or the pulse mode, according to the control signal.

6. The photographic apparatus according to claim 5, wherein when a level of the control signal is greater than a first potential, the drive current has a maximum current value.

7. The photographic apparatus according to claim 6, wherein when the level of the control signal is less than a second potential, the drive circuit generates the drive current according to the level of the control signal and the maximum current value, wherein the second potential is less than the first potential.

8. A photographic apparatus, comprising:
a main controller configured to output an exposure sequence and an exposure signal corresponding to the exposure sequence;
an image sensor electrically connected to the main controller and configured to capture a continuous image according to the exposure sequence, and the main controller calculates an exposure value according to the continuous image;
a light emitting unit; and
a control unit electrically connected to the main controller, the image sensor and the light emitting unit, and according to the exposure value, the control unit configured to select a continuous mode to drive the light emitting unit to emit light continuously, or a pulse mode to cooperate with the exposure signal to drive the light emitting unit to pulse light, in order to fill light while capturing the continuous image.

9. The photographic apparatus according to claim 8, wherein the control unit uses a drive current to drive the light emitting unit to emit light, when the control unit selects the continuous mode, the drive current does not exceed a first threshold continuously, and when the control unit selects the pulse mode, a peak of a pulse period of the drive current is not less than a second threshold, wherein the second threshold is greater than the first threshold.

10. The photographic apparatus according to claim 9, wherein the control unit further selects a continuous pulse mode to cooperate with the exposure signal in driving the light emitting unit to pulse corresponding light according to the exposure value, wherein when the control unit selects the continuous pulse mode, the peak of the pulse period of the drive current does not exceed the first threshold.

11. The photographic apparatus according to claim 9, wherein the control unit comprises:
a control circuit configured to generate a control signal according the exposure value, wherein the control signal corresponds to the continuous mode or the pulse mode; and
a drive circuit configured to generate the drive current corresponding to the continuous mode or the pulse mode, according to the control signal.

12. The photographic apparatus according to claim 11, wherein when a level of the control signal is greater than a first potential, the drive current has a maximum current value.

13. The photographic apparatus according to claim 12, wherein when the level of the control signal is less than a second potential, the drive circuit generates the drive current according to the level of the control signal and the maximum current value, wherein the second potential is less than the first potential.

14. A photographic apparatus, comprising:
an image sensor configured to capture a continuous image and to generate an exposure signal, according to an exposure sequence corresponding to the continuous image;
a light emitting unit; and
a control unit electrically connected to the image sensor and the light emitting unit, and according to a frequency of the exposure sequence, the control unit configured to select a continuous mode to drive the light emitting unit to emit light continuously, or a pulse mode to cooperate with the exposure signal to drive the light emitting unit to pulse light, in order to fill light while capturing the continuous image.

15. The photographic apparatus according to claim 14, wherein when the frequency of the exposure sequence is less than a first frequency, the control unit selects the continuous mode to drive the light emitting unit to emit light continuously; and when the frequency of the exposure sequence is greater than a second frequency, the control unit selects the pulse mode to cooperate the exposure signal to drive the light emitting unit to pulse light, wherein the second frequency is greater than the first frequency.

16. An exposure luminance adjustment method applied to a photographic apparatus having a light emitting unit, the method comprising following steps:
(a) calculating an exposure value according to a continuous image;
(b) generating an exposure signal according to an exposure sequence corresponding to the continuous image; and
(c) selecting a continuous mode to drive the light emitting unit to emit light continuously, or a pulse mode to cooperate with the exposure signal to drive the light emitting unit to pulse light, according to the exposure value.

17. The exposure luminance adjustment method according to claim 16, wherein the step(c) comprises:
generating a drive current corresponding to the selection of the continuous mode or the pulse mode, according to the exposure value; and
driving the light emitting unit to emit light continuously or to pulse light, according to the drive current.

18. The exposure luminance adjustment method according to claim 17, wherein when the continuous mode is selected, the corresponding drive current does not exceed a first threshold; and when the pulse mode is selected, a peak of a pulse period of the corresponding drive current is not less than a second threshold, and the second threshold is greater than the first threshold.

19. The exposure luminance adjustment method according to claim 18, wherein the step (c) further comprises a continuous pulse mode to be selected to cooperate with the exposure signal to drive the light emitting unit to pulse light according to the exposure value, wherein luminance of the light emitted by the light emitting unit in the continuous pulse mode is less than luminance of the light emitted by the light emitting unit in the pulse mode.

* * * * *